United States Patent
Fikar et al.

(10) Patent No.: US 10,044,418 B2
(45) Date of Patent: Aug. 7, 2018

(54) VEHICLE COMMUNICATION SYSTEM AND METHOD FOR OPERATING SUCH A SYSTEM

(71) Applicant: Bayerische Motoren Werke Aktiengesellschaft, Munich (DE)

(72) Inventors: Stefan Fikar, Munich (DE); Markus Kaindl, Neubiberg (DE); Sajjad Khan, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/166,363

(22) Filed: May 27, 2016

(65) Prior Publication Data

US 2016/0277079 A1    Sep. 22, 2016

Related U.S. Application Data

(63) Continuation of application No. PCT/EP2014/075493, filed on Nov. 25, 2014.

(30) Foreign Application Priority Data

Nov. 29, 2013  (DE) .................. 10 2013 224 514

(51) Int. Cl.
  *H04B 7/02*  (2018.01)
  *H04B 7/0413* (2017.01)
  (Continued)

(52) U.S. Cl.
  CPC ....... *H04B 7/0413* (2013.01); *H04B 7/15507* (2013.01); *H04B 7/2606* (2013.01); *H04L 67/12* (2013.01); *H04W 84/12* (2013.01)

(58) Field of Classification Search
  CPC ............. H04B 7/0413; H04B 7/15507; H04B 7/2606; H04L 67/12; H04W 84/12
  (Continued)

(56) References Cited

U.S. PATENT DOCUMENTS 6,493,629 B1    12/2002  Van Bosch
6,861,942 B1 *   3/2005  Knapp ................ B60C 23/0408
                                                 340/2.8

(Continued)

FOREIGN PATENT DOCUMENTS

CN    102544766 A    7/2012
CN    103579780 A    2/2014

(Continued)

OTHER PUBLICATIONS

International Search Report (PCT/ISA/210) issued in PCT Application No. PCT/EP2014/075493 dated Mar. 3, 2015 with English translation (five pages).

(Continued)

*Primary Examiner* — Chieh M Fan
*Assistant Examiner* — Fitwi Hailegiorgis
(74) *Attorney, Agent, or Firm* — Crowell & Moring LLP (57) ABSTRACT

A communication system is provided for a vehicle having multiple antennas and multiple transmitting and/or receiving interfaces. At least one first antenna is arranged in the interior of the vehicle, and at least one second antenna is arranged on the outside of the vehicle. The first antenna is designed to wirelessly establish at least one part of a data connection between a first communication unit which is located in the interior of the vehicle and at least one first network base unit which is located outside of the vehicle via a first transmitting and/or receiving interface. The second antenna is designed to wirelessly establish at least one part of a data connection between a second communication unit which is located in the interior of the vehicle and the first and/or a second network base unit which is located outside of the vehicle via a second transmitting and/or receiving interface. The communication system is designed such that a data connection can be established within the vehicle (Continued)

between the second communication unit and the first antenna via the second transmitting and/or receiving interface.

17 Claims, 4 Drawing Sheets

(51) Int. Cl.
*H04B 7/155* (2006.01)
*H04B 7/26* (2006.01)
*H04L 29/08* (2006.01)
*H04W 84/12* (2009.01)

(58) Field of Classification Search
USPC .............................. 375/267; 455/562.1, 517
See application file for complete search history.

(56) References Cited

U.S. PATENT DOCUMENTS

| | | | | |
|---|---|---|---|---|
| 2002/0022494 | A1* | 2/2002 | Brand | B60R 25/24 455/517 |
| 2003/0058502 | A1* | 3/2003 | Griffiths | G01R 33/283 398/139 |
| 2010/0234071 | A1* | 9/2010 | Shabtay | H04B 7/0408 455/562.1 |
| 2012/0098717 | A1* | 4/2012 | Petrucci | H01Q 21/28 343/713 |
| 2013/0076577 | A1 | 3/2013 | Chakam et al. | |
| 2013/0337872 | A1 | 12/2013 | Fertl et al. | |

FOREIGN PATENT DOCUMENTS

| | | |
|---|---|---|
| DE | 10 2009 015 135 A1 | 12/2009 |
| DE | 10 2011 116 430 A1 | 4/2012 |
| DE | 10 2010 061 995 A1 | 5/2012 |
| DE | 10 2012 208 303 A1 | 11/2013 |
| DE | 10 2012 208 641 A1 | 11/2013 |
| EP | 1 863 119 A1 | 12/2007 |
| EP | 1 903 632 A1 | 3/2008 |
| EP | 2 128 841 A1 | 12/2009 |

OTHER PUBLICATIONS

German-language Written Opinion (PCT/ISA/237) issued in PCT Application No. PCT/EP2014/075493 dated Mar. 3, 2015 (seven pages).

German Search Report issued in counterpart German Application No. 10 2013 224 514.9 dated May 12, 2014 with partial English translation (12 pages).

Chinese Office Action issued in Chinese counterpart application No. 201480064854.4 dated May 8, 2018, with English translation (Nineteen (19) pages).

* cited by examiner

VEHICLE COMMUNICATION SYSTEM AND METHOD FOR OPERATING SUCH A SYSTEM

CROSS REFERENCE TO RELATED APPLICATIONS

This application is a continuation of PCT International Application No. PCT/EP2014/075493, filed Nov. 25, 2014, which claims priority under 35 U.S.C. § 119 from German Patent Application No. 10 2013 224 514.9, filed Nov. 29, 2013, the entire disclosures of which are herein expressly incorporated by reference.

BACKGROUND AND SUMMARY OF THE INVENTION

The invention relates to a communication system for a vehicle and to a method for operating such a communication system. Motor vehicles nowadays are equipped in many cases with a communication system via which a mobile radio connection to a mobile radio network can be effected from the interior of the vehicle. In this case, the communication system can include a hands-free installation which can be connected temporarily during the journey to a mobile terminal such as a smart phone, for example. In this case, the connection can be effected in a wired manner or else by means of a wireless local radio connection, for example in accordance with the Bluetooth standard.

Furthermore, provision can be made for the communication system of the vehicle to include a mobile radio unit fixedly integrated in the vehicle, e.g. a so-called telematics unit. Such a unit can be used to set up a connection to central switching stations of a mobile radio network and, in particular, a telephone connection to central service providers for further control units of the vehicle such as, for example, for a navigation device or for a multimedia device. In this respect, BMW Group offers the System Connected Drive, for example, via which a connection to an information service, the so-called concierge service, or to an emergency call center can be set up directly from a vehicle.

In addition, a telematics unit can be used to set up a data connection to central computers such as, for example, so-called "backend servers" of national information services or to database services. Such connections can include Internet connections, in particular.

Components of a communication system, which can be used to establish a wireless connection to a computer network, for example wireless local area network (WLAN) components, can furthermore be provided in a vehicle.

For the respective connections into the mobile radio or computer networks, corresponding antennas are provided in the vehicle, in particular in the interior and/or on the exterior of the vehicle. Via these antennas communication units situated fixedly or temporarily in the interior of the vehicle can be connected to radio units and/or network components situated outside the vehicle. By way of example, one or a plurality of mobile radio antennas can be pro vided on the exterior of the vehicle in order to set up a wireless connection to base stations of mobile radio networks. By way of example, a WLAN antenna can be provided in the interior of the vehicle. The interior and exterior antennas can be connected to one another for example via a controller fitted in or on the vehicle.

EP 1 863 119 A1, EP 1 903 632 A1 and DE 10 2010 061 995 A disclose antenna modules for mobile radio connections for vehicles which, in each case, include a plurality of antennas. The contents of the publications cited above are hereby incorporated by reference in the present description.

It is an object of the invention, with a communication system for a vehicle which includes a plurality of antennas, to enable a connection between communication units which is as stable as possible.

This and other objects are achieved according to the invention by a communication system for a vehicle including a plurality of antennas and a plurality of transmitting and/or receiving interfaces. At least one first antenna is arranged in the interior of the vehicle. At least one second antenna is arranged on the exterior of the vehicle. The first antenna is designed to wirelessly establish via a first transmitting and/or receiving interface at least one part of a data connection between a first communication unit situated in the interior of the vehicle and at least one first network base unit situated outside the vehicle. The second antenna, is designed to wirelessly establish via a second transmitting and/or receiving interface at least one part of a data connection between a second communication unit situated in the interior of the vehicle and the first and/or a second network base unit situated outside the vehicle. The communication system is designed in such a way that a data connection can be established within the vehicle between the second communication unit and the first antenna via the second transmitting and/or receiving interface.

By virtue of the fact that a data connection can be established within the vehicle between the second communication unit and the first antenna via the second transmitting and/or receiving interface, particularly in the case of a failure of the second antenna, it can be ensured that a mobile radio and/or data connection to a network base unit and thus to the mobile radio and/or data network or to the outside world can still be established by a communication unit situated in the interior of the vehicle. This advantage of the invention is extremely important for example if the second antenna fails owing to an accident of the vehicle and an emergency call is intended to be transmitted from the interior of the vehicle.

The invention is based on the insight, in particular, that the first antenna, arranged within the vehicle, in the case of an accident of the vehicle, is protected against damage significantly better than the second antenna, situated outside the vehicle. In this case, the invention is furthermore based on the insight that the interior of the vehicle affords good protection against mechanical damage for the first antenna. In this case, the term interior encompasses, in particular, a space which with high probability remains relatively intact in the case of an accident or a space which is insensitive to externally acting mechanical impacts and/or is protected by means of one or more protection devices, such as e.g. the passenger compartment, the trunk and/or the engine compartment. The second antenna, arranged on the exterior of the vehicle is fitted in particular at least partly outside the vehicle body, for example in a housing fitted to the exterior of the vehicle roof, such as e.g. a so-called roof fin. In this case, this mounting location is particularly suitable for bringing about on the vehicle side with the second antenna a higher reception sensitivity and/or effective emission power in comparison with the vehicle-internal first antenna, particularly because there are hardly any shielding effects of the vehicle body there.

What can furthermore advantageously be achieved by means of the invention is that the communication system comprises within the vehicle only a first antenna, which, however, is designed for optionally implementing two communication connections, in particular for a first network connection to a mobile terminal within the vehicle, which may be a WLAN connection, and for a second network connection from a mobile radio unit provided fixedly in the vehicle, in particular from a telematics unit, directly to a network base station situated outside the vehicle. In the context of the present invention, the term WLAN should be understood as a generic term for various radio transmission technologies by way of which computers can be networked, for example in accordance with one of the technology standards IEEE 802.11xx.

A communication connection brought about by the communication system can be designed as a voice and/or data connection, e.g. according to one of the technology standards GSM (Global System for Mobile Communications) or LTE (Long Term Evolution). The at least one antenna provided within the vehicle can be designed as a WLAN antenna in order, as an antenna of the WLAN access point, to establish a wireless connection to a mobile terminal situated in the vehicle. For this purpose, corresponding components and interfaces for processing data and signals corresponding to the respective technology standards are provided in the vehicle. In this case, components and/or interfaces can also be provided which transmit signals and/or data between the vehicle-internal WLAN access point and mobile radio base stations situated outside the vehicle and/or process said signals and/or data.

The transmitting and/or receiving interfaces can include, in particular, components which can process signals and/or data according to at least one of the standards WLAN and LTE. The transmitting and/or receiving interfaces can be designed, in particular, at least partly as corresponding integrated circuits (chip). The communication units can be designed in each case for establishing mobile radio connections and/or data transmission connections. They can be temporarily situated in the vehicle as mobile units (e.g. as a smartphone) or fixedly installed in the vehicle (e.g. as a telematics unit).

The invention makes it possible, in particular, for the vehicle antenna used for the respective communication device to be flexibly coupled to the communication device as required. The connection between the second communication unit and the first antenna can be established automatically in this case when predefined conditions occur. The conditions can be detected by use of a sensor system. For this purpose, it is furthermore possible to predefine coupling rules with which the coupling is effected in a parameter-controlled and/or sensor-controlled manner. The predefined conditions can encompass a failure and, in particular, the entire or partial mechanical and/or electrical destruction of the second antenna and/or an accident of the vehicle. A corresponding coupling rule can be, for example, the fact that in the case of an accident event which is detected by a sensor unit of the vehicle and which triggers an airbag, for example, firstly a check is made to ascertain whether a communication connection to a network base station can be effected via at least one antenna fitted to the exterior of the vehicle and, otherwise, a communication connection is set up via at least one antenna, arranged in the vehicle. A corresponding check can also be initiated in a different way, for example if an emergency call button is pressed in the vehicle.

In the communication system, in particular a switching arrangement can be provided, by which optionally a data connection to the first antenna or to the second antenna can be established by the second transmitting and/or receiving interface. By means of the switching arrangement, in particular the first transmitting and/or receiving interface can also be switchable or switched between the two antennas. The switching arrangement can include, in particular, a wired double pole double throw (DPDT) switch and/or control components which are used to implement the coupling rules.

The transmitting/receiving unit provided for the interior can thus be switched to the exterior as necessary. This may be beneficial e.g. for dialing into an external WLAN hotspot.

In one preferred exemplary embodiment of the invention, the first and, in particular, also the second transmitting and/or receiving interface and the first antenna are arranged in the interior of the vehicle in a transmitting/receiving unit. This unit can include a so-called network access device (NAD).

By means of the invention, a stable communication connection and a good connection quality toward the outside can be made possible even for a plurality of devices situated in the interior region of the vehicle.

In accordance with a further advantageous exemplary embodiment of the invention, on the exterior of the vehicle, a third antenna is arranged and, in the interior of the vehicle, a third transmitting and/or receiving interface is arranged, which can be used to establish at least one part of a communication connection between the first, the second and/or a third communication unit arranged in the vehicle and the network base unit situated outside the vehicle. At least one of the transmitting and/or receiving interfaces can be, in particular, an LTE interface. In particular, the first transmitting and/or receiving interface can be a WLAN interface comprising at least one WLAN-enabled component. The second and/or the third transmitting and/or receiving interface can be, in each case, a mobile radio interface, in particular an LTE interface, which comprises at least one LTE-enabled component. The first antenna, can be designed in particular in such a way that it can transmit and/or receive both WLAN signals and mobile radio signals, in particular LTE signals.

In a further advantageous exemplary embodiment of the invention, the second and third antennas are arranged, in each case, on the roof of the vehicle. They are surrounded in particular by a common enclosure, designed for example as a roof fin.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
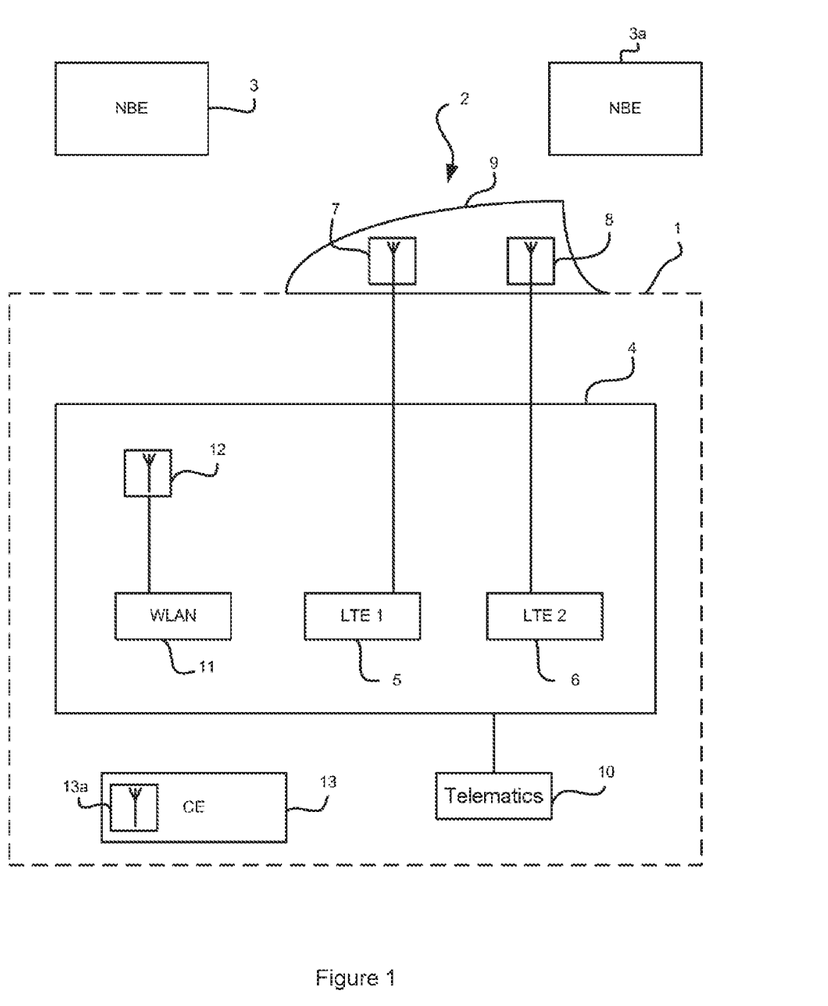
FIG. 1 is a schematic diagram of a vehicle with a first communication unit.

FIG. 1 illustrates a motor vehicle 1 having a communication system 2, via which an LTE communication connection between the motor vehicle 1 and fixedly installed network base stations 3, 3a of a national mobile radio infrastructure of a mobile radio operator can be established.

The communication system 2 can furthermore establish communication connections via further communication standards such as GSM 1/2/3 and WLAN. The heart of the communication system 2 is a network access device (NAD) 4. The latter in turn comprises, as transmitting and receiving interfaces, electronic LTE control components (chips) 5, 6, which control the LTE-specific communication with the network base station 3 according to an LTE network protocol. For this purpose, the LTE control component 5 is furthermore connected to an external antenna 7 fixed on the exterior of the roof of the motor vehicle 1 in a roof fin housing 9. The LTE control component 6 is correspondingly connected to an external antenna 8, likewise situated in the housing 9. For setting up an LTE connection from the vehicle 1 to the network base station 3, both LTE control components 5, 6 and both antennas 7, 8 are used. For a GSM mobile radio connection between the vehicle 1 and one of the network base stations 3, 3a, by contrast, it suffices to use in each case only one of the antennas 7, 8 and a corresponding GSM control component. For this purpose, provision is made, in particular, for the LTE control components 5, 6 also to be GSM-enabled. The antennas 7, 8 are also suitable for transmitting both signals according to the LTE standard and signals in accordance with at least one of the GSM standards GSM1, GSM2 and GSM3.

In the motor vehicle 1, furthermore, a telematics unit 10 is fixedly incorporated, which is connected to the network access device 4 and via which it can set up a mobile radio connection to one of the network base stations 3, 3a. Optionally, the LTE control component 5 and antenna 7 or the LTE control component 6 and antenna 8 are used for this purpose.

Furthermore, as transmitting and/or receiving interface, a WLAN control component 11 and a WLAN antenna 12 connected thereto are provided in the network access device 4 and thus also within the motor vehicle 1. The WLAN control component 11 can establish a data connection to the network base station 3 and/or 3a as a communication connection via the two LTE control components 5, 6 and the two external antennas 7, 8 and in the process enable network access to a computer network, for example to the Internet. Via the vehicle-internal antenna 12, it can provide the network access as WLAN access for a mobile terminal 13 situated in the motor vehicle 1, for example a smartphone or CE device, via the antenna 13a thereof. WLAN control component 11 and antenna 12 then function as a WLAN access point.

Figure 2:
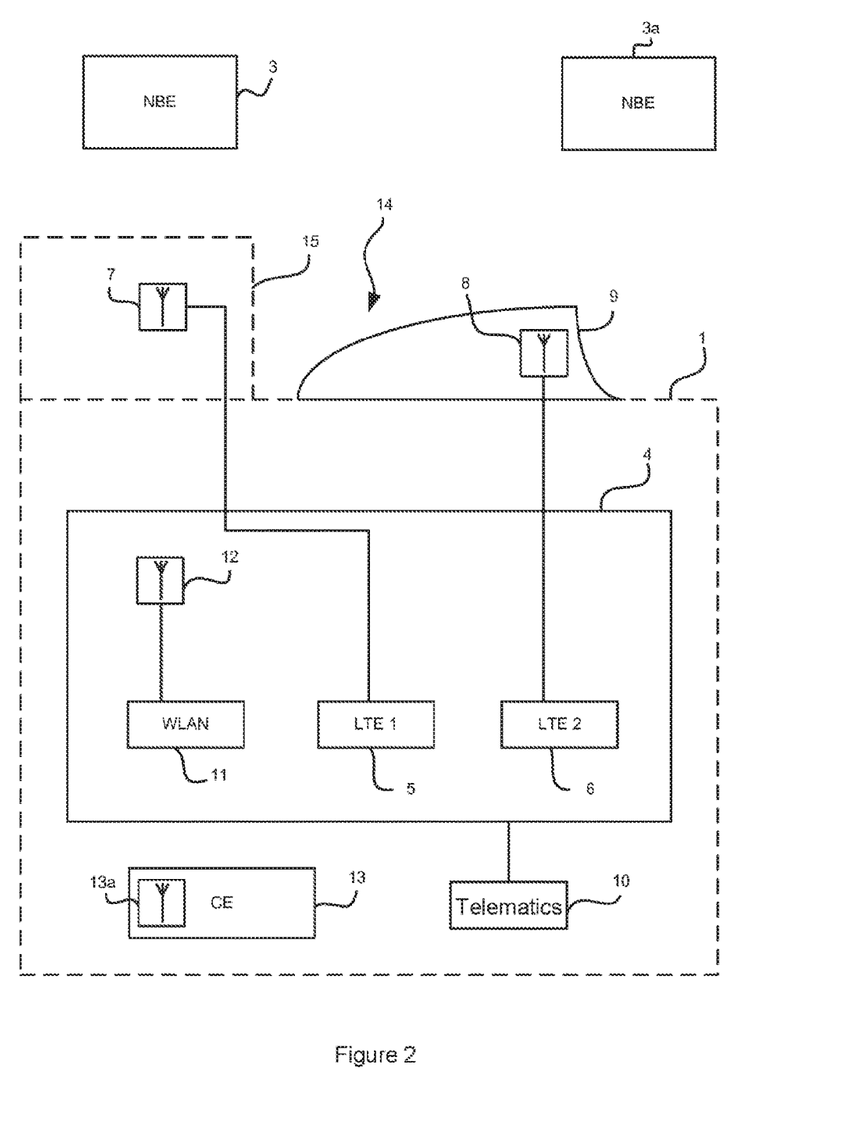
FIG. 2 is a schematic diagram of a vehicle with a second communication unit.

FIG. 2 illustrates a communication system 14 of a motor vehicle 1. The communication system largely corresponds to the communication system 2 in FIG. 1. Identical system components once again are provided with the same reference signs. What is different in the communication system 14 is, in particular, that the antenna 7 connected to the LTE control component 5 is not situated in the roof fin housing 9, but rather on the trunk partition or at some other location in the interior 15 of the motor vehicle 1.

Figure 3:
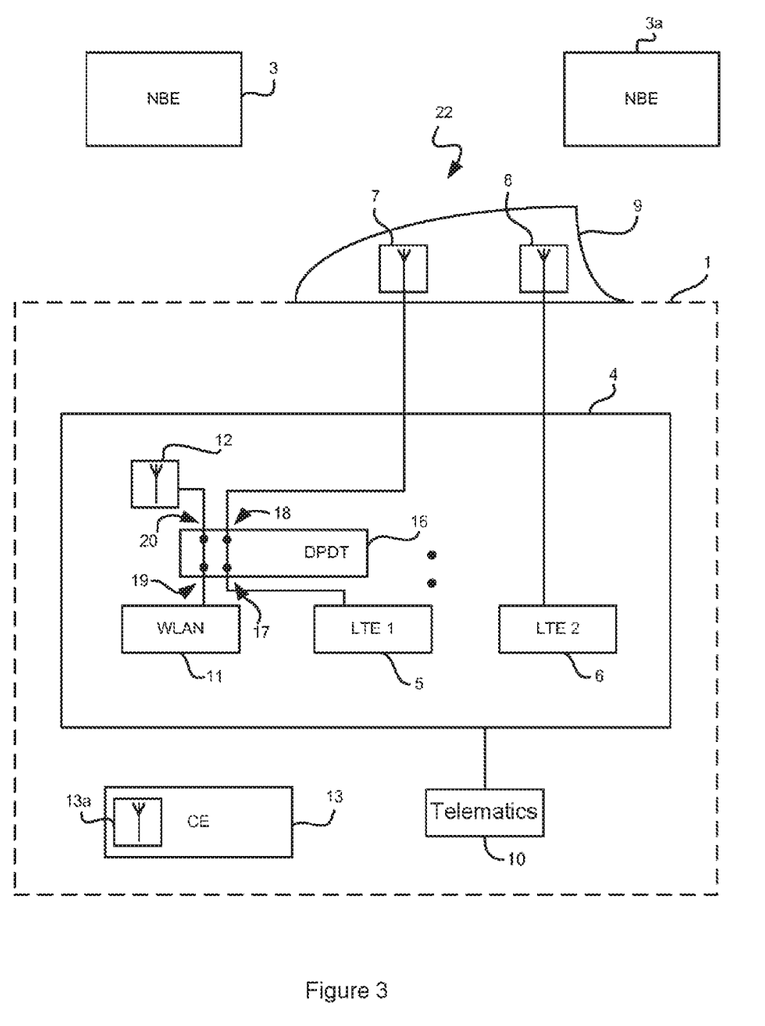
FIG. 3 is a schematic diagram of a vehicle with a switching device in a first operating state.

FIG. 3 illustrates a further version of the communication system 2 or 14 modified by comparison with FIG. 1, identical system components once again being provided with the same reference signs. The communication system 22 shown here additionally includes a switching device 16 in the form of a double pole double throw (DPDT) switch, which in turn has four connections for inputs and outputs and can assume different switching positions. The LTE control component 5 is connected to the first connection 17. The LTE control component, in the switching position shown here, is connected via the connection 18 to the antenna 7 fitted on the exterior of the motor vehicle 1. In the shown switching position of the switching device 16, the WLAN control component 11 is furthermore connected via the connections 19 and 20 to the vehicle-internal WLAN antenna 12. The uncrossed switching position of the switching device 16 as shown in FIG. 3 thus enables the same communication connections as the communication system 2 shown in FIG. 1.

Figure 4:
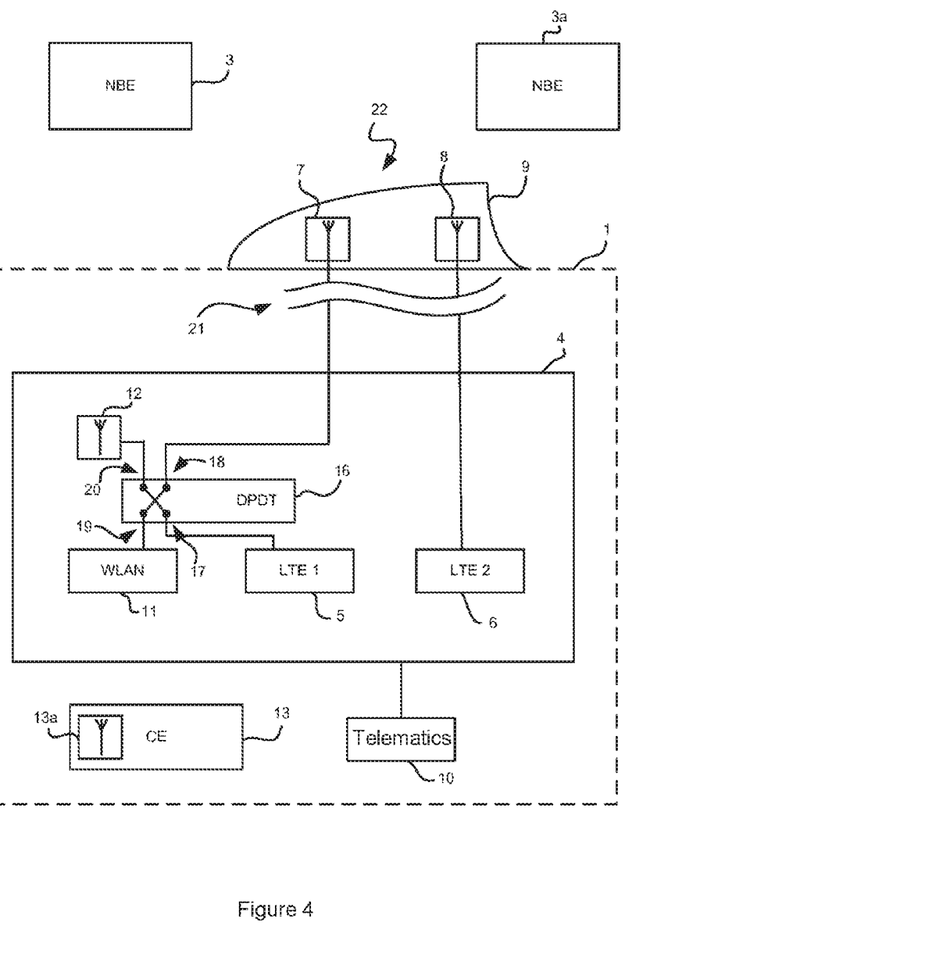
FIG. 4 is a schematic diagram of a vehicle with a switching device in a second operating state.

FIG. 4 shows the communication system 22 in a state in which the connections between antennas 7, 8 and the LIE control components 5, 6 are interrupted. This interruption 21 may have arisen, for example, in the event of an accident of the motor vehicle 1. It may have been caused by a mechanical and/or electrical destruction of the antennas 7, 8 and/or of the corresponding connecting lines. By contrast, the WLAN antenna 12 situated in the protected passenger compartment of the motor vehicle 1 is still functional.

The motor vehicle 1 additionally has an electronic controller (not shown in the figures) and a sensor system for detecting an accident of the vehicle, which includes for example an acceleration sensor and a corresponding evaluation device. In the case of a detected accident event, a check is automatically made to ascertain whether, for a predefined communication unit, in this exemplary embodiment for the telematics unit 10, a data connection via at least one of the antennas 7, 8 fitted on the exterior of the motor vehicle 1 to at least one of the network base stations 3 and/or 3a can be effected. If no such connection arises, the controller automatically instigates the connection between the telematics unit 10 and the internal antenna 12 via the LTE control component 5. For establishing the connection between the LTE control component 5 and the internal antenna 12, a corresponding connection between the connection 17 for the LTE unit 5 and the connection 20 for the antenna 12 is established in the switching device 16. The switching device 16 is in its crossed state in this case.

The communication system 15 shown in FIG. 2 can likewise be designed with a corresponding switching arrangement 16 according to the modifications in FIGS. 3 and 4.

The devices and system components described are controlled in particular by computer programs and for this purpose can have further elements known per se of computers and digital control devices such as a microprocessor, volatile and nonvolatile memories, interfaces, etc. Therefore, the invention can also be realized wholly or partly in the form of a computer program product which, when loaded and executed on a computer, wholly or partly brings about a sequence according to the invention. The computer program product can be provided for example in the form of a data earner such as a CD or DVD or else in the form of one or a plurality of files on a server from which the computer program is downloadable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system for a vehicle, comprising:
a plurality of antennas; and
a plurality of transmitting and/or receiving interfaces,
wherein
at least one first antenna is arranged in an interior of the vehicle, and at least one second antenna is arranged on an exterior of the vehicle, the first antenna arranged in the interior of the vehicle can transmit and receive both wireless local area network (WLAN) signals and mobile radio signals and is designed to wirelessly establish via a first transmitting and/or receiving interface component via WLAN signals at least one part of a data connection between a mobile terminal situated in the interior of the vehicle and at least one first network base unit situated outside the vehicle, the second antenna can transmit and receive mobile radio signals and is designed to wirelessly establish via a second transmitting and/or receiving interface component at least one part of a data connection between a mobile radio unit that is fixed in the interior of the vehicle and the first and/or a second network base unit situated outside the vehicle via the mobile radio signals, and the communication system is designed such that a data connection is establishable between the mobile radio unit that is fixed in the interior of the vehicle and the first and/or the second network base unit situated outside the vehicle via the second transmitting and/or receiving interface component and the first antenna and the mobile radio signals, wherein the first antenna communicates directly with the first and/or the second network base unit situated outside the vehicle for this data connection.

2. The communication system according to claim 1, further comprising:
a switching arrangement, by which optionally a data connection to the first antenna or to the second antenna is establishable by the second transmitting and/or receiving interface component, and/or the first transmitting and/or receiving interface component is switchable between the two antennas.

3. The communication system according to claim 1, wherein the first transmitting and/or receiving interface component and the first antenna are arranged in the interior of the vehicle in a transmitting/receiving unit.

4. The communication system according to claim 1, wherein the first transmitting and/or receiving interface component is a WLAN interface control component, and the second transmitting and/or receiving interface component is a mobile radio interface control component.

5. The communication system according to claim 1, wherein the second and a third antenna are, in each case, arranged on the roof of a vehicle and are surrounded by a common enclosure.

6. The communication system according to claim 1, further comprising:
an electronic controller and a sensor assembly for detecting an accident of the vehicle, wherein
in the case of a detected accident event, a check is automatically made to ascertain whether for a predefined communication unit, a data connection via at least one of the antennas fitted to the exterior of the vehicle to a network base station can be effected and, if no such connection can be effected, the electronic controller automatically causes the connection between said predefined communication unit and the first antenna.

7. The communication system according to claim 1, wherein the mobile radio signals are Long Term Evolution (LTE) signals or Global System for Mobile Communications (GSM) signals.

8. A method for establishing an at least partly wireless communication connection between at least one communication unit situated in a vehicle and a central network base station, wherein
at least one first antenna is arranged in an interior of the vehicle, wherein the first antenna can transmit and receive both wireless local area network (WLAN) signals and mobile radio signals, and
at least one second antenna is arranged on an exterior of the vehicle, wherein the second antenna can transmit and receive mobile radio signals,
wherein the method comprises the acts of:
using the first antenna to wirelessly establish via a first transmitting and/or receiving interface component via WLAN signals at least one part of a data connection between a mobile terminal situated in the interior of the vehicle and at least one first network base unit situated outside the vehicle, and
using the second antenna to wirelessly establish via a second transmitting and/or receiving interface component at least one part of a data connection between a mobile radio unit that is fixed in the interior of the vehicle and the first and/or a second network base unit situated outside the vehicle via the mobile radio signals, and
establishing a data connection within the vehicle between the mobile radio unit that is fixed in the interior of the vehicle and the first and/or the second network base unit situated outside the vehicle via the second transmitting and/or receiving interface component and the first antenna and the mobile radio signals, wherein the first antenna communicates directly with the first and/or the second network base unit situated outside the vehicle for this data connection.

9. The method according to claim 8, wherein the connection between the mobile radio unit and the first antenna is established automatically when at least one predefined condition occurs.

10. The method according to claim 9, wherein the predefined condition comprises one or more of a failure of the second antenna or an accident of the vehicle.

11. The method according to claim 10, wherein the connection between the mobile radio unit and the first antenna is established via a cross-connection which is provided between at least two antennas and two communication units and by which at least the mobile radio unit is connectable optionally to the first antenna or to the second antenna for the data connection.

12. The method according to claim 8, wherein the mobile radio signals are Long Term Evolution (LTE) signals or Global System for Mobile Communications (GSM) signals.

13. A controller for a vehicle communication system having at least one first antenna arranged in an interior of the vehicle and at least one second antenna arranged on an exterior of the vehicle, wherein the first antenna can transmit and receive both wireless local area network (WLAN) signals and mobile radio signals and wherein the second antenna can transmit and receive mobile radio signals, the controller comprising a computer that executes a program to:
use the first antenna to wirelessly establish via a first transmitting and/or receiving interface component via WLAN signals at least one part of a data connection between a mobile terminal situated in the interior of the vehicle and at least one first network base unit situated outside the vehicle, and use the second antenna to wirelessly establish via a second transmitting and/or receiving interface component at least one part of a data connection between a mobile radio unit that is fixed in the interior of the vehicle and the first and/or a second network base unit situated outside the vehicle via the mobile radio signals, and establish a data connection between the mobile radio unit that is fixed in the interior of the vehicle and the first and/or the second network base unit situated outside the vehicle via the second transmitting and/or receiving interface component and the first antenna and the mobile radio signals, wherein the first antenna communicates directly with the first and/or the second network base unit situated outside the vehicle for this data connection.

14. The controller according to claim 13, wherein the computer executes a program to automatically establish the connection between the mobile radio unit and the first antenna when at least one predefined condition occurs.

15. The controller according to claim 14, wherein the predefined condition comprises one or more of a failure of the second antenna or an accident of the vehicle.

16. The controller according to claim 13, wherein the computer executes the program to establish the connection between the mobile radio unit and the first antenna via a cross-connection provided between at least two antennas and two communication units and by which at least the mobile radio unit is connectable optionally to the first antenna or to the second antenna for the data connection.

17. The controller according to claim 13, wherein the mobile radio signals are Long Term Evolution (LTE) signals or Global System for Mobile Communications (GSM) signals.

* * * * *